US008911812B2

(12) United States Patent
Suarez_Mason

(10) Patent No.: US 8,911,812 B2
(45) Date of Patent: Dec. 16, 2014

(54) APPARATUS FOR COOKING

(76) Inventor: Eduardo C. Suarez_Mason, Toronto (CA)

(*) Notice: Subject to any disclaimer, the term of this patent is extended or adjusted under 35 U.S.C. 154(b) by 0 days.

(21) Appl. No.: 13/579,391

(22) PCT Filed: Feb. 21, 2011

(86) PCT No.: PCT/CA2011/050105
§ 371 (c)(1),
(2), (4) Date: Aug. 16, 2012

(87) PCT Pub. No.: WO2011/103681
PCT Pub. Date: Sep. 1, 2011

(65) Prior Publication Data
US 2012/0315363 A1   Dec. 13, 2012

Related U.S. Application Data

(60) Provisional application No. 61/308,860, filed on Feb. 26, 2010.

(51) Int. Cl.
*A47J 27/04* (2006.01)

(52) U.S. Cl.
USPC ........... 426/510; 426/511; 426/523; 426/644; 99/345; 99/419; 99/421 H; 126/369; 126/5; 126/20

(58) Field of Classification Search
CPC ........ A23L 1/0121; A47J 27/16; A47J 27/04; A47J 2027/043; A47J 37/106
USPC ............ 426/510, 511, 523, 644; 99/345–347, 99/403, 419, 421 H, 447, 467, 473–474; 126/369–369.3, 5, 20–20.2
See application file for complete search history.

(56) References Cited

U.S. PATENT DOCUMENTS

| | | | | |
|---|---|---|---|---|
| 102,913 A * | 5/1870 | Mason | ......................... | 215/276 |
| 1,485,253 A * | 2/1924 | Devlin | ........................ | 99/419 |
| 1,955,289 A * | 4/1934 | Greenfield | .................... | 426/510 |
| 2,457,867 A * | 1/1949 | Chambers | ........................ | 53/79 |
| 2,827,541 A * | 3/1958 | Baldwin | ........................ | 99/343 |
| 2,835,480 A * | 5/1958 | Perez | ........................ | 165/104.21 |
| 3,164,289 A * | 1/1965 | Cocchiarella | ................. | 220/578 |
| 3,339,480 A * | 9/1967 | Raman | ........................ | 99/421 H |
| 3,379,118 A * | 4/1968 | Perez | ............................. | 99/419 |
| 3,391,271 A * | 7/1968 | Campbell | .................... | 219/440 |
| 3,639,725 A * | 2/1972 | Maniscalco | .................. | 219/401 |
| 4,051,973 A * | 10/1977 | Botkin | ......................... | 215/260 |
| 4,129,066 A * | 12/1978 | Corley | ............................ | 99/345 |
| 4,406,861 A * | 9/1983 | Beauvais et al. | ............. | 422/113 |
| 4,655,192 A * | 4/1987 | Jovanovic | ....................... | 126/20 |
| 4,810,856 A * | 3/1989 | Jovanovic | ..................... | 219/401 |
| 4,906,485 A * | 3/1990 | Kirchhoff | ..................... | 426/506 |

(Continued)

*Primary Examiner* — Drew E Becker

(74) *Attorney, Agent, or Firm* — The IP LOaw Firm of Guy Levi, LLC; Guy Levi

(57) ABSTRACT

According to embodiments of the present invention, there is provided a cooking apparatus for cooking a foodstuff. The cooking apparatus comprises a vessel configured to accept, in use, liquid therein; a closing sub-assembly configured to be releasably coupled to the vessel, the closing sub-assembly defining an aperture; a steam leading tube operatively coupled to the aperture, the steam leading tube configured to provide a passage, in use, for the steam generated within the vessel from the liquid towards an interior of the foodstuff.

17 Claims, 8 Drawing Sheets

(56) References Cited

U.S. PATENT DOCUMENTS

| | | | | |
|---|---|---|---|---|
| 5,427,816 A * | 6/1995 | Harlaux et al. | | 426/614 |
| 5,913,965 A * | 6/1999 | Gargano | | 99/346 |
| 6,502,501 B1 * | 1/2003 | Simon | | 99/345 |
| 6,725,764 B2 * | 4/2004 | Sherwin | | 99/419 |
| 7,549,369 B2 * | 6/2009 | Zimmerman | | 99/532 |
| 7,638,736 B2 * | 12/2009 | Adamczak et al. | | 219/401 |
| 2002/0100371 A1 * | 8/2002 | Snoke et al. | | 99/419 |
| 2004/0131738 A1 * | 7/2004 | Holm et al. | | 426/511 |
| 2008/0053317 A1 * | 3/2008 | Estermann et al. | | 99/468 |
| 2008/0063773 A1 * | 3/2008 | Maguire | | 426/523 |
| 2011/0226135 A1 * | 9/2011 | Oswald | | 99/419 |
| 2012/0199015 A1 * | 8/2012 | Seguchi et al. | | 99/403 |

* cited by examiner

APPARATUS FOR COOKING

CROSS REFERENCE TO RELATED APPLICATIONS

The present application is a National Phase entry of PCT Application No. PCT/CA2011/050105, filed Feb. 21, 2011, which claims priority from U.S. Provisional Application No. 61/308,860, filed Feb. 26, 2010, now expired, the disclosures of all which are incorporated herein by reference in their entirety.

TECHNICAL FIELD

The present invention generally relates to, but is not limited to, the field of cooking, and more specifically the present invention relates to, but is not limited to, an apparatus for cooking.

BACKGROUND

Various devices exist for cooking, such as an oven, a stove top, a grill, an open flame of fire. These cooking devices are used for preparation of various foodstuffs, including, but not limited to, meat, poultry, vegetables and alike. It is known to use different heat sources in order to cook various foods, such as either using the heat provided from an oven, stove or grill, or having built-in heat source.

It is appreciated that while cooking large fowls such as turkeys, there is a good chance that the cooking may render uneven cooking results. This is due, at least partially, to the fact that the most delicate meat is in the breast that is directly exposed to the heat source, therefore it is being cooked much faster than the interiorly located dark meat, which is shielded by the carcass of the bird and surrounded by dense bones. As a result, the bird can be unevenly cooked, causing one portion of the bird to become overcooked and/or another portion of the bird to be undercooked.

Most cook books recommend cooking a turkey for about 20 minutes per pound in a 325° F. oven. Therefore, an average 17 pound turkey conventionally takes five to six hours to cook. A solution known by professionals is to separate the breast meat from the dark meat, cooking them separately and to reassemble the bird for table presentation. Evidently, this is not a convenient solution for the presented problem, especially for home cooking applications.

Several solutions have been disclosed in the prior art, solutions involving use of an open vessel inserted into the inner hollow cavity of the meat or poultry in order to provide steam into the inner cavity of the meat when roasting. Examples of such prior art cooking devices are described more detail in the following patents CN 11344268; CN 21208192; KR 7072354; U.S. Pat. No. 6,779,438; KR 4077094; U.S. Pat. No. 6,575,082; U.S. Pat. No. 6,502,501; U.S. Pat. No. 7,146,905; WO10247524; U.S. Pat. No. 6,125,739; U.S. Pat. No. 6,192,792; JP 2000271016; RU 2164529; JP 2000166771; U.S. Pat. No. 6,230,612; U.S. Pat. No. 6,062,131; U.S. Pat. No. 5,797,312; U.S. Pat. No. 5,501,142; U.S. Pat. No. 4,913,039; U.S. Pat. No. 4,159,675.

Most of the devices described in the above-referenced documents are designed in a somewhat similar manner and are generally configured to transfer some heat by conduction directly into the foodstuff, which leaves little or no space for steam to cook the meat, rather most of the steam escapes to the outside not to the most inner surface of cavity of the meat which is abutting the outer surface of the open ended can. In addition the steam is only heated to 212° F., i.e. substantially the boiling point of water. In addition, in such devices, the meat or poultry is held in an upright position, which does not provide optimal heat distribution. Another disadvantage of these devices is the necessity to adapt the diameter of the open ended vessel respectively to the diameter of the inner cavity of the cooking foodstuff. Holding the meat in an upright position is unstable and causes possible dripping of liquids onto the heat source.

In the case of cooking large fowls, such as turkeys, usage of this method of cooking is limited due to requirements of size of the heat source, such as an oven or a grill. Furthermore, said method does not allow cooking a stuffed bird as steam dispersion inside the inner cavity of the fowl is blocked by stuffing. All mentioned above has to be performed while, maintaining the stability during cooking process, protecting the exterior of the meat from overexposure to intense heat and allowing shortening the cooking process.

SUMMARY

According to a first broad aspect of the present invention, there is provided a cooking apparatus for cooking a foodstuff. The cooking apparatus comprises a vessel configured to accept, in use, liquid therein; a closing sub-assembly configured to be releasably coupled to the vessel, the closing sub-assembly defining an aperture; a steam leading tube operatively coupled to the aperture, the steam leading tube configured to provide a passage, in use, for the super-heated steam generated within the vessel from the liquid towards an interior of the foodstuff.

According to a second broad aspect of the present invention, there is provided a closing sub-assembly configured to be releasably coupled to a vessel, the closing sub-assembly comprising, the vessel and the closing sub-assembly in use operable to be used to cook foodstuff. The closing sub-assembly comprises a lid defining an aperture; a steam leading tube operatively coupled to the aperture, the steam leading tube configured to provide a passage, in use, for the super-heated steam generated within the vessel from the liquid towards an interior of the foodstuff.

According to another broad aspect of the present invention, there is provided a method of cooking foodstuff, the method comprising subjecting the foodstuff to a stream of super-heated steam while cooking.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

DESCRIPTION OF THE NON-LIMITING EMBODIMENTS

Figure 1:
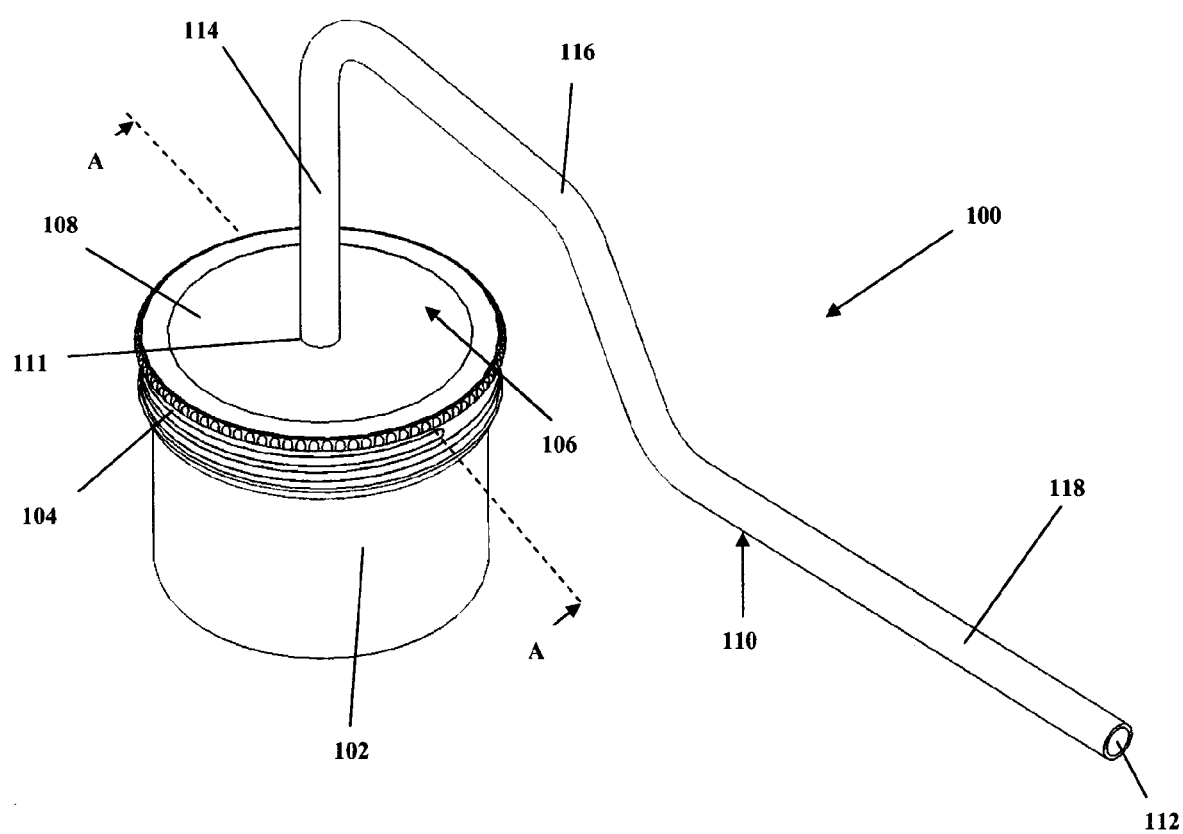
FIG. 1 is a perspective view of a cooking apparatus implemented in accordance with a non-limiting embodiment of the present invention, the cooking apparatus being depicted in the assembled state.
Figure 2:
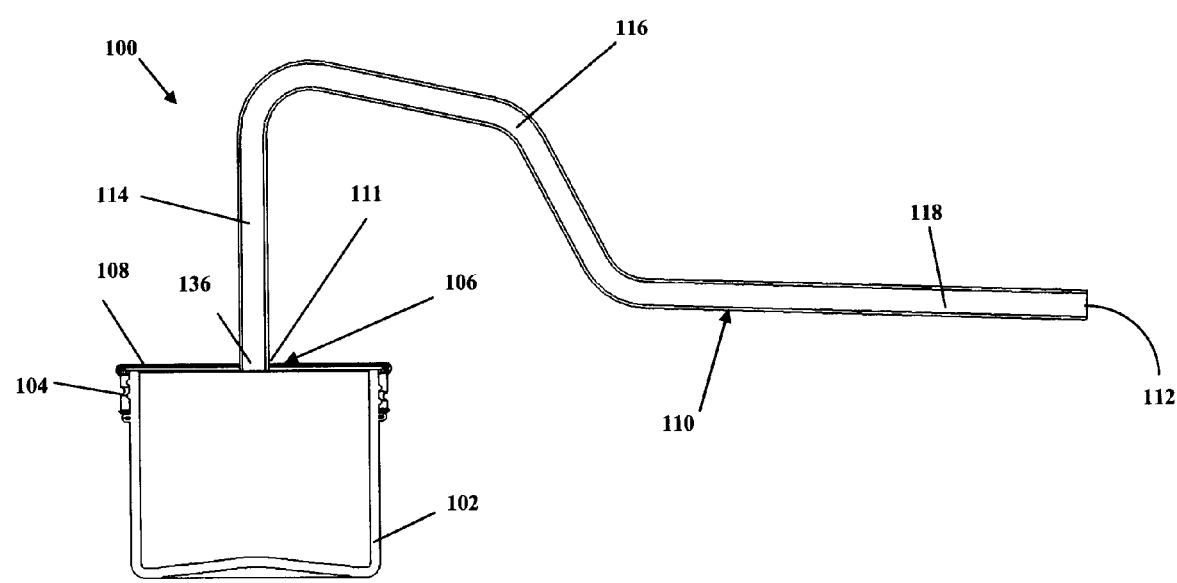
FIG. 2 is a sectional view of the cooking apparatus of FIG. 1 taken along lines A-A of FIG. 1.
Figure 3:
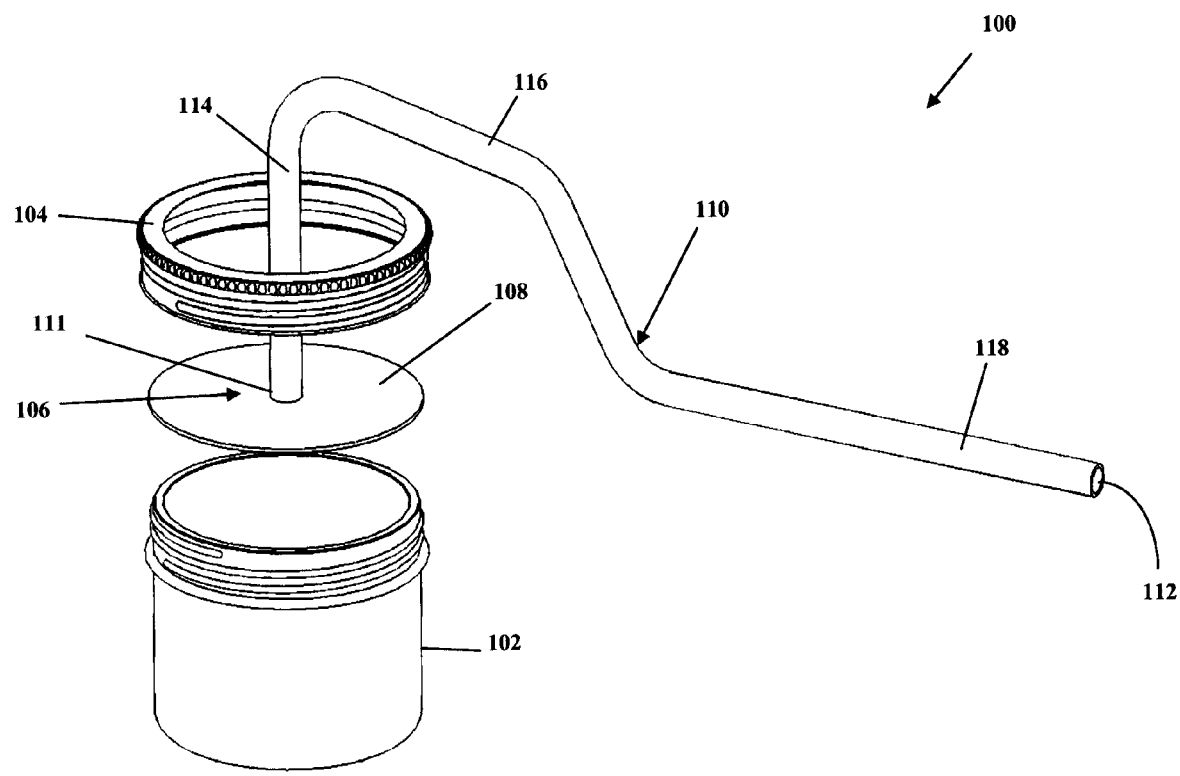
FIG. 3 is a perspective exploded view of the cooking apparatus as shown in FIG. 1.

Reference is now made to FIG. 1, which depicts a perspective view of a cooking apparatus 100, the cooking apparatus 100 being implemented in accordance with a non-limiting embodiment of the present invention. The cooking apparatus 100 is depicted in an assembled state. Reference will additionally be made to FIG. 2, which depicts a sectional view of the cooking apparatus 100 taken along lines A-A of FIG. 1 and to FIG. 3, which depicts a perspective exploded view of the cooking apparatus 100 of FIG. 1.

According to embodiments of the present invention, the cooking apparatus 100 comprises a vessel 102. As will be described in greater detail herein below, the vessel 102 is configured to accept, in use, a liquid (such as water and the like) therein (depicted in FIG. 7). The construction of the vessel 102 will be described later on, for the time being suffice it to state, that the vessel 102 can be made of aluminum. In alternative embodiments of the present invention, the vessel 102 can be made of stainless steel, such as 304 food grade stainless steel. In further embodiments, the vessel 102 can be made of tempered glass or, in other words, glass which can withstand heat. Other materials can of course be used for producing the vessel 102. It is noted that the size of the vessel 102 is selected such as to balance the amount of liquid it is capable to accept and the time it takes for the selected amount of liquid to boil and to start releasing steam.

The vessel 102 defines a threaded portion on a top end thereof, as will be discussed in greater detail herein below. The threaded portion can be of conventional implementation, such as a single start or multiple start thread. It is noted that in a specific non-limiting embodiment of the present invention, the vessel 102 can be implemented as an off-the-shelve jar, commercially available, such as a preserve jar and the like.

The cooking apparatus 100 further comprises a closing sub-assembly 106, the closing sub-assembly 106 being configured to be releasably coupled to the vessel 102, which allows, in use, to contain the liquid therein. Within embodiments of the present invention, the closing sub-assembly 106 comprises a lid 108 suitable to cover the vessel 102. The closing sub-assembly 106 further comprises a screw collar 104. Generally speaking, the screw collar 104 is configured to releasably retain the lid 108 to the vessel 102. To that extent and as will be shown herein below, the screw collar 104 comprises an inner thread complementary to the above-mentioned threaded portion of the vessel 102.

Even though the lid 108 and the screw collar 104 are illustrated as separate members, in alternative embodiments of the present invention, the lid 108 and the screw collar 104 can be implemented as a unitary structure.

The cooking apparatus 100 further includes a steam leading tube 110 operatively coupled to the closing sub-assembly 106 and, more specifically, to the lid 108. The purpose for the steam leading tube 110 will be described in greater detail herein below, however for the time being suffice it to state that the steam leading tube 110 is operatively coupled to the lid 108 and is configured to provide a passage, in use, for the steam generated within the vessel 102 from the liquid towards an interior of the foodstuff being cooked (as will be described in greater detail herein below). As will be appreciated the term "operatively coupled" within the framework of the lid 108 and the steam leading tube 110 is meant to define a coupling that allows for direction of steam from the vessel 102 through the steam leading tube 110. It can be said that the steam leading tube 110 is associated with geometry (length, etc), which allows to place the vessel 102 substantially away from the foodstuff being cooked (unlike prior art approaches, whereby the vessels were placed substantially proximate or within the foodstuff being cooked).

The steam leading tube 110 can be coupled to the lid 108 by means of heat welding or other suitable means (such as, a screw in coupling, twist in coupling and the like). Alternatively, it is contemplated that the lid 108 and the steam leading tube 110 can be integrally made, such as by a form forming process and the like. Within embodiments of the present invention, the steam leading tube 110 and the lid 108 can be made of stainless steel, such as for example, 304 food grade stainless steel.

As can be appreciated from the illustration, the steam leading tube 110 has two opposed ends—a first end 111 that is coupled to the lid 108, and a second end 112 that is open to provide steam passage as will be described in greater detail herein below. As can be further appreciated from the illustrations, the steam leading tube 110 is hollow.

Within embodiments of the present invention, the steam leading tube 110 is implemented as having three portions, a proximal portion 114 located in proximity to the lid 108, an intermediate portion 116 and a distal portion 118. Within a specific implementation of the instant invention, the proximal portion 114, the intermediate portion 116 and the distal portion 118 are implemented in a form factor that jointly defined a "goose neck shape", but this needs not be so in every embodiment of the instant invention and other form factors for the steam leading tube 110 can be used (such as for example, a coil-shaped implementation and the like). The "goose neck shape" has an advantage of securing the cooking apparatus 100 when moving it in and out of the oven, as will be described below, however, this is not to say that other form factors can not be advantageous as well.

It is noted that the design of the steam leading tube 110 allows placing the vessel 102 substantially away from the entry into a cavity of the foodstuff being cooked, as will be shown in greater detail herein below. It can also be said that the steam leading tube 110 is configured to allow for providing a distance between the vessel 102 and the foodstuff being cooked.

Furthermore, the design of the steam leading tube 110 allows to "super-heat" the steam as it travels through the steam leading tube 110 by exposing the steam to the heat conducted from the walls of the steam leading tube 110. In a sense, the steam as it travels through the steam leading tube 110 "super-heats" substantially to the temperature of the oven, while maintaining its heat conductive properties (due primarily to selection of the length of the steam leading tube 110).

It is also noted that the diameter of the steam leading tube 110 is selected to balance the heating rate together with the length of the steam leading tube 110. One will appreciate that the larger the diameter of the steam leading tube 110, the more the heating surface to which the steam is exposed. One skilled in the art will appreciate that this needs to be balanced with the fact that at some point "white steam", as it gets hotter and hotter, expands further (and looses the "whiteness" and loses its ability to carry heat. Therefore, one will need to balance the length and diameter of the steam leading tube 110 to ensure optimal superheating of the steam, which can be done by empirical experimentations.

The distal portion 118 defines the above-mentioned opening 112 for expelling the steam. It is noted that the shape of the steam leading tube 110 is not limited and in alternative embodiments, the steam leading tube 110 can be implemented with more or fewer portions.

Needless to say that the lid 108 is of a diameter that is suitable to be releasably close the vessel 102—in other words, in cooperation with the screw collar 104 to close and maintain the liquid within the vessel 102. It should be noted that the lid 108, the screw collar 104 and the vessel 102 are configured to withhold a certain degree of internal pressure as the liquid therein boils and the steam is generated. The typical range of anticipated pressure is between approximately 1 and 3 psi, even though other ranges may be applicable and depend on specific implementations and uses. Within this context, one needs to ensure that there is a proper sealing between the lid 108, the screw collar 104 and the vessel 102, which collectively ensures that the steam escapes substantially through the steam leading tube 110.

Figure 4:
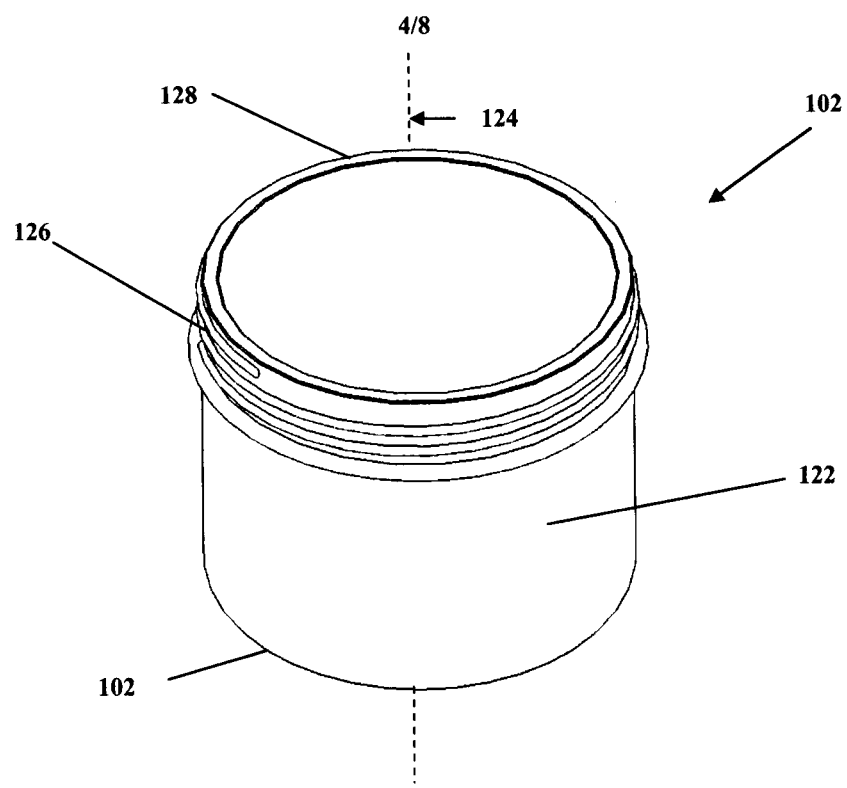
FIG. 4 is a perspective view of a vessel of the cooking apparatus as shown in FIG. 1.

Reference is now made to FIG. 4, which depicts a perspective view of the vessel 102 of the cooking apparatus 100 of FIG. 1. Within the implementation of FIG. 4, the vessel 102 is implemented as a commercially available glass jar, which within the illustration is of BERNARDIN/MASON™ type (such as a jar for a preserve or jam or the like), but this needs not be so in every embodiment of the present invention. The vessel 102, within this illustration, is implemented as a container suitable for holding approximately 8 oz of liquid. The vessel 102 comprises a closed end 120 (which in this example is implemented as a flat circular bottom) and a side wall 122 (which in this example is implemented as generally cylindrical) extending longitudinally along axis such as 124. The upper portion of the side wall 122 defines an external thread 126 (defined above as a threaded portion for generality), which ends in an upper end 128. In some embodiments of the present invention (where the vessel 102 is implemented as an off-the-shelf jar), the upper end 128 of the vessel 102 can be treated (for example, with a grit diamond hone plate) to ensure proper sealing with the lid 108. In other embodiments, the geometry of the upper end 128 may in and of itself be sufficient to ensure proper sealing and, as such, no additional treatment may be required.

It should be expressly understood that even though the vessel 102 in FIG. 4 is depicted as circular in cross-section, this needs not be so in every embodiment of the present invention. As such, in alternative non-limiting embodiments of the present invention, the vessel 102 can be implemented with square, oval, triangular and other suitable cross-sections.

Figure 5:
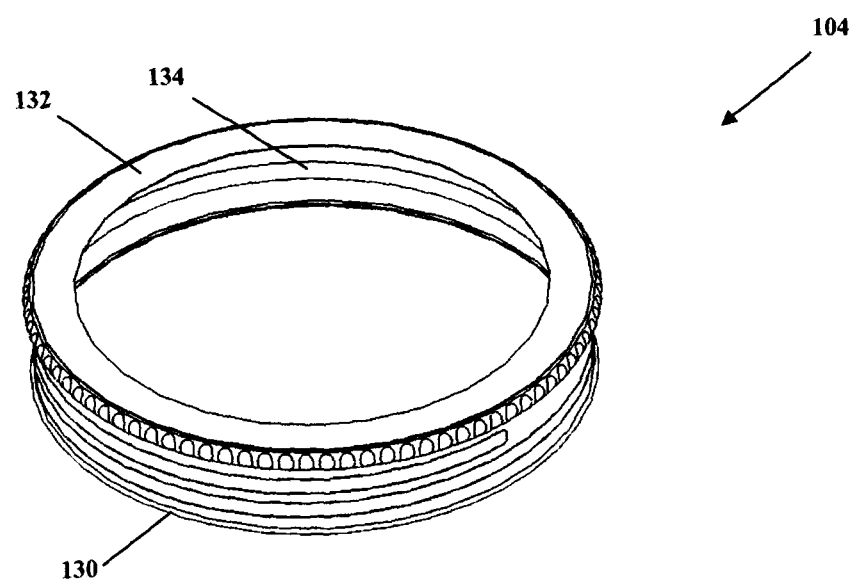
FIG. 5 is a perspective view of a closing collar of the cooking apparatus as shown in FIG. 1.

Reference is now made to FIG. 5, which depicts a perspective view of the screw collar 104 of the cooking apparatus 100 of FIG. 1. The screw collar 104 is generally an annular member, which defines two opposed ends. A first bottom end 130 and a second upper end which defines an internally radially extending rim 132. The screw collar 104 further comprises a thread 134 on its inner surface.

In alternative embodiments of the present invention the screw collar 104 can be coupled to the vessel 102 by means other than a threaded coupling, such as a snap-on coupling, for instance. Also, needless to say that the form factor of the lid 108 and the screw collar 104 need to be complementary to the form factor of the vessel 102.

Figure 6:
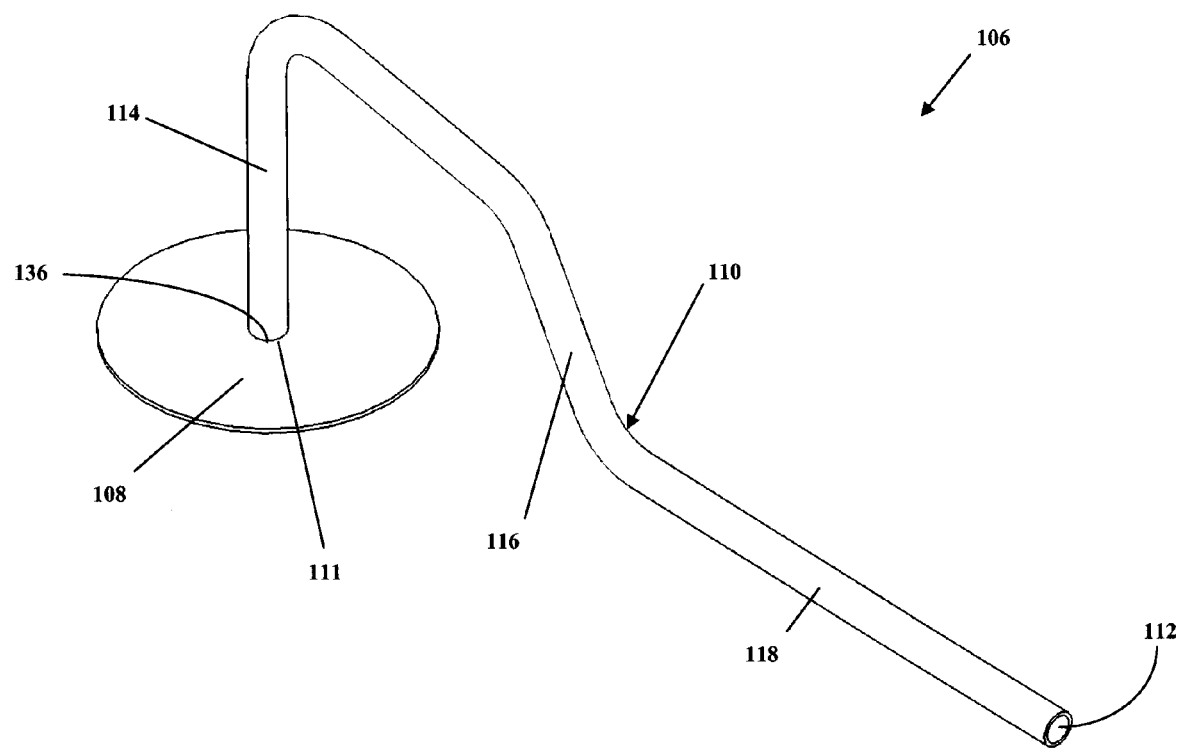
FIG. 6 is a perspective view of a lid and a steam leading tube, in an assembled state, of the cooking apparatus as shown in FIG. 1.

Reference is now made to FIG. 6, which depicts a perspective view of the lid 108 and the steam leading tube 110 of the cooking apparatus 100 of FIG. 1. Within embodiments of the present invention, the lid 108 is implemented as a disc-shaped member with an aperture 136, into which the steam leading tube 110 is mounted. Even though the aperture 136 is depicted as being defined substantially in the center of the lid 108, this needs not be so in every embodiments of the present invention. Within embodiments of the present invention, the lid 108 and the steam leading tube 110 can be made of stainless steel. However, it should be understood that other materials can be used for one or both of the lid 108 and the steam leading tube 110.

Figure 7:
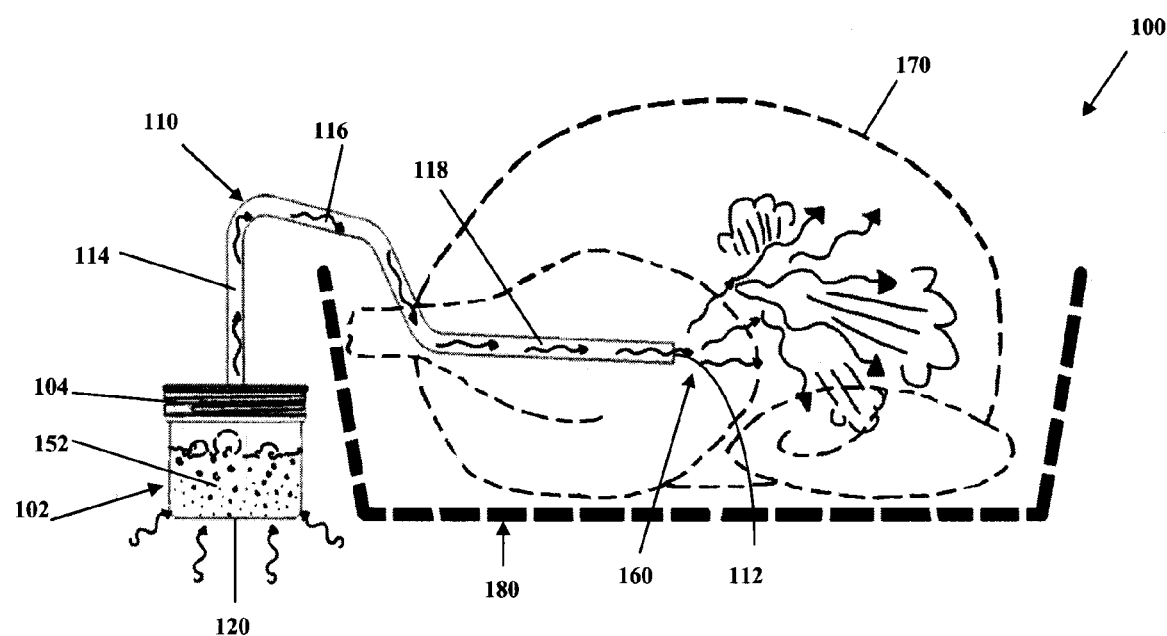
FIG. 7 is a schematic view of the side elevation of the cooking apparatus as shown of FIG. 1, which further includes a tray and a foodstuff.
Figure 8:
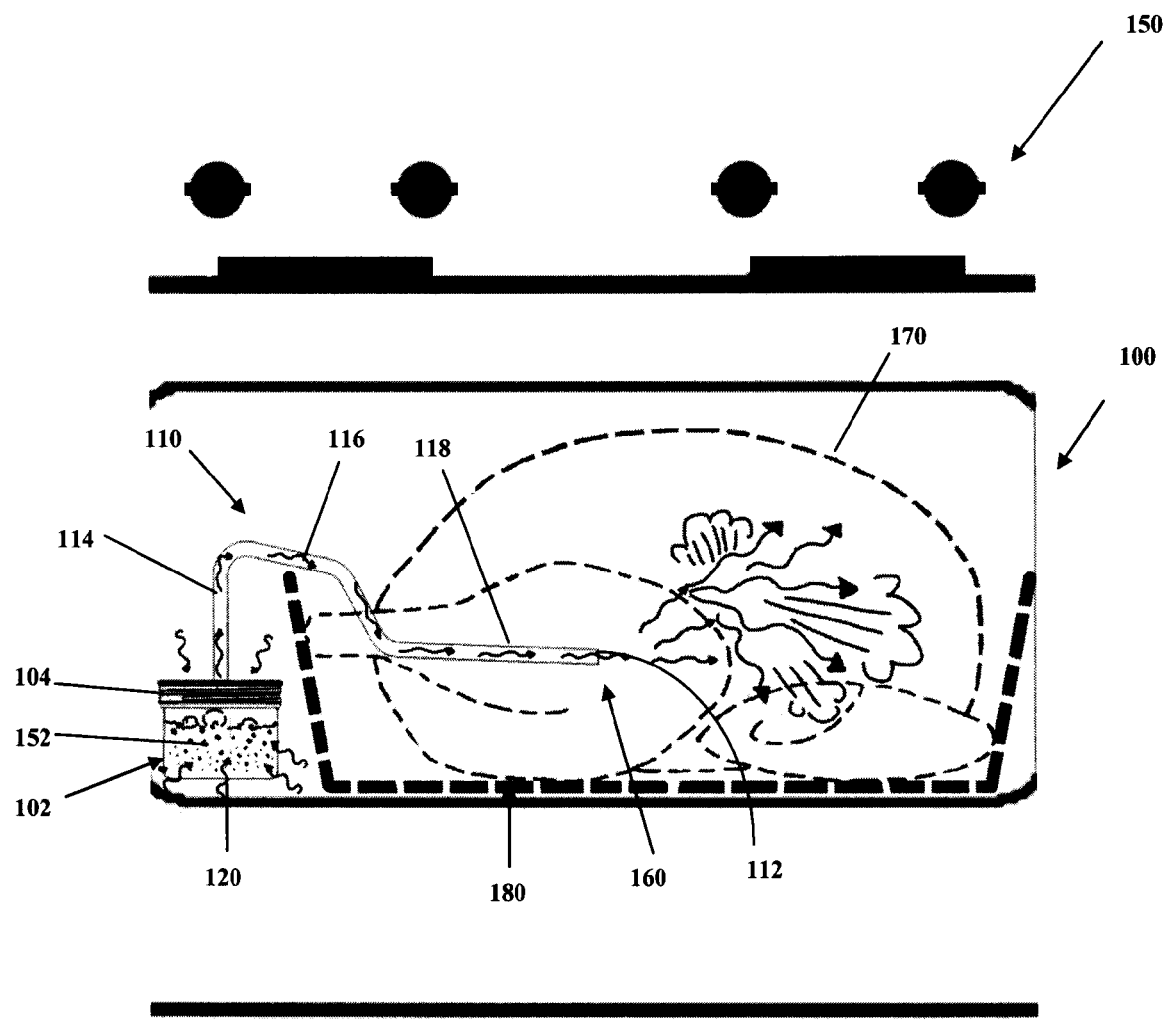
FIG. 8 is a schematic view of the side elevation of the cooking apparatus of FIG. 7 presented within an oven.

Reference is now made to FIG. 7, which depicts a schematic representation of the side elevation of the cooking apparatus 100 of FIG. 1, which includes further components used during the cooking process. Reference is additionally made to FIG. 8, which depicts of the cooking apparatus 100 as shown in FIG. 1, during the cooking process within an oven or any other heat source.

Having described the structure of the cooking apparatus 100, operation thereof will be described in greater detail. The vessel 102 is filled with liquid 152, such as water, seasoned water or the like. The cooking apparatus 100 is then assembled into the assembled state (with the lid 108 and the steam leading 110 tube attached to the vessel 102) The cooking apparatus 100 is then placed within a heat source, such as an oven 150 (see FIG. 8), with the closed end 120 of the vessel 102 resting on the bottom surface (not separately numbered) of the oven 150.

Recalling that the steam leading tube 110 includes a distal portion 118 for expelling the steam, such distal portion 118 is positioned within the item being cooked, such as for example, an inner cavity 160 of a bird 170. Within embodiments of the present invention, the bird 170 is placed within any commercially available cooking tray 180, which can be placed horizontally within the oven 150. It is noted that the cooking apparatus 100 and the cooking tray 180 and the bird 170 can all be placed in substantially horizontal orientation. An additional technical advantage of such an arrangement is that any dripping would stay within the cooking tray 180. This can be beneficial to avoid drippings on the heat source surface. Additionally or alternatively, the technical advantage of this structure is that it also does not require any supporting means for holding the bird in an upright position.

The oven 150 is then heated up to a conventional cooking temperature. The cooking temperature for the oven 150 is not particularly limited and, as an example, the oven 150 can be operated with the heat setting of approximately 325° F. At this point, the liquid 152 will slowly start boiling and evaporate while releasing pressurized steam into the steam leading tube 110. The pressurized steam will rise through the aperture 136 of the lid 108 and travel along the steam leading tube 110. This particular structure allows "super-heating" of the steam and achieving steam temperature equal to the inside temperature of the oven 150.

The steam that rises into the "goose neck shape" remains trapped within the curves of the steam leading tube 110 for a period of time. As the steam is urged to rise, it lingers in the curve of the steam leading tube 100 while heating up. As more steam is generated within the vessel 102, back pressure is created that eventually and periodically forces the "superheated" steam down the steam leading tube 110 and out into the inner cavity of the bird 170. It is this trapping effect that allows for the super-heating of the white steam, which would otherwise be not hot enough for the cooking effect desirable herein. Therefore, when selecting the shape of the steam leading tube 110, one needs to consider this trapping effect and its significance for the super-heating of the steam.

At this point, while the steam is traveling through the distal portion 118 of the steam leading tube 110, it enters the inner cavity 160 of the bird 170 and is further transferred while transferring heat through convection to the inner cavity 160 of the bird 170 and thus aiding the cooking process of the bird 170.

Embodiments of the present invention lead to a technical advantage, whereby the cooking time can be shortened, while saving energy and providing optimal cooking results. It is believed that the cooking time can be shortened by as much as 50%. This is achievable due, at least in part, by means of equal cooking temperatures on the exterior surface of the bird 170 as well as in the interior surface of the bird 170. Put another way, a technical advantage of some embodiments of the present invention, includes the ability to super-heat the steam to the temperature of the oven 150. This provides even interior and exterior cooking results.

Yet another technical advantage of the cooking apparatus 100 described above is that the bird 170 can be positioned horizontally within a cooking tray 180, avoiding the need of any additional custom made parts and enabling stability of the cooking arrangement.

In the case of a stuffed foodstuff, the cooking apparatus 100 described herein, can lead to the released steam penetrating the stuffing, which reduces the cooking time of the object approximately by half. The inner stuffing and the inner cavity proximate meat reaches cooking temperature of approximately 190° F. simultaneously with the exterior proximate meat, resulting in even heat distribution among the inner and outer surfaces.

Yet further advantage of the cooking apparatus 100 described in present invention is that the pressurized steam is entering the bird and the heat is further transferred by convection, while balancing the inner and outer cooking temperatures.

It should be expressly understood that the cooking apparatus 100, even though described with reference to cooking a bird can find application in cooking many other foodstuffs, such as but not limited to, meat, fish, vegetables, bread and other solid foodstuffs. Within those embodiments of the present invention where the cooking apparatus 100 is used for cooking vegetables, the second end 112 is placed within substantially middle of a tray housing vegetables being cooked. Within those embodiments of the present invention where the cooking apparatus 100 is used to cook bread, for example, the second end 112 is placed within substantially middle of the dough to be cooked.

It should be noted that in embodiments of the present invention and from the commercial perspective, the cooking apparatus 100 can be sold as depicted in FIG. 1, in other words, including the vessel 102, the closing sub-assembly 106 and the steam leading tube 110. In alternative implementations, the cooking apparatus 100 can be sold as the closing sub-assembly 106 and the steam leading tube 110, in which case, a user (not depicted) can attach the closing sub-assembly 106 and the steam leading tube 110 to an appropriate implementation of the vessel 102, such as commercially available jar and the like. Needless to say that within the latter implementation, the closing sub-assembly 106 has to be adapted to be used with specific implementation of the vessel 102 and, as such, a selection of closing sub-assemblies 106 can be sold adapted to interact with a specific one of the selection of implementations of the vessel 102. It is also contemplated that the cooking apparatus 100 can be sold including the illustration of FIG. 1 and the cooking tray 180 as a kit. Other variations are, of course, also possible. It has been shown above that the cooking apparatus 100 allows to cook foodstuff with super-heated steam by providing non-limiting embodiments of the cooking apparatus 100 that allows to super-heat steam and to direct the so-super-heated steam towards the foodstuff being cooked. Accordingly, what is provided is a method of cooking whereby the foodstuff being cooked is subjected to a stream of super-heated steam while cooking, which can be produced by non-limiting embodiments of the cooking apparatus 100.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

I claim:

1. A cooking apparatus for cooking a foodstuff, the cooking apparatus comprising:
   a vessel configured to accept a liquid therein;
   a closing sub-assembly configured to be releasably coupled to the vessel, the closing sub-assembly defining an aperture a cooking tray for positioning the foodstuff and wherein the cooking tray and the vessel are placed substantially along a single surface while in use;
   a steam leading tube operatively coupled to the aperture, the steam leading tube configured to provide a passage for a super heated steam generated within the vessel from the liquid towards an interior of the foodstuff, wherein said steam leading tube comprises at least a first portion located in proximity to the closing sub-assembly and a second portion defining a second end for insertion into the foodstuff, said second portion extends substantially in parallel to said cooking tray and a curve is defined between said first portion and said second portion.

2. The cooking apparatus of claim 1, wherein the steam leading tube is configured to provide a distance between the vessel and the foodstuff.

3. The cooking apparatus of claim 1, wherein the vessel is a jar.

4. The cooking apparatus of claim 3, wherein the vessel defines an external thread and the external thread has been treated by a hone plate to ensure sealing with the closing sub-assembly.

5. The cooking apparatus of claim 1, wherein the closing sub-assembly comprises a lid and a screw collar, the lid and the screw collar configured to releasably close the vessel and wherein it is the lid that defines the aperture.

6. The cooking apparatus of claim 5, wherein the lid and the screw collar are one of (i) implemented as separate members and (ii) implemented as a unitary structure.

7. The cooking apparatus of claim 5, wherein the steam exists substantially through the aperture and through the steam leading tube.

8. The cooking apparatus of claim 1, wherein the vessel comprises a closed end for positioning on a surface within an oven.

9. The cooking apparatus of claim 1, wherein the steam leading tube is goose neck shaped to provide for trapping of the steam in said curve and thus "super-heat" the steam as it travels through the steam leading tube.

10. The cooking apparatus of claim 9, wherein the ratio between length and diameter of the steam leading tube is selected such as to prevent the steam from heating to a point whereby it loses at least a portion of the capability to carry heat.

11. The cooking apparatus of claim 1, wherein the closing sub-assembly and the steam leading tube are integrally made using a forming process.

12. The cooking apparatus of claim 1, wherein said steam leading tube comprises a proximal portion located in proximity to the closing sub-assembly, a distal portion and an intermediate portion located therebetween, said distal portion extends substantially in parallel to said closing sub-assembly and a first curve is defined between said proximal portion and said intermediate portion and a second curve is defined between the intermediate portion and the distal portion.

13. A method of cooking a foodstuff comprising:
providing a vessel containing a liquid, a closing sub-assembly configured to be releasably coupled to said vessel and having an aperture formed within said closing sub-assembly;
further providing a steam leading tube operatively coupled to said aperture;
heating an oven to a pre-determined temperature positioning a cooking tray for the foodstuff and the vessel substantially along a single surface within the oven;
subjecting the foodstuff via said aperture and said steam leading tube to a stream of super-heated steam at substantially said pre-determined temperature.

14. The method of cooking a foodstuff according to claim 13, wherein said steam leading tube comprises a proximal portion located in proximity to the closing sub-assembly, a distal portion defining a second end and an intermediate portion located therebetween, said distal portion extends substantially in parallel to said closing sub-assembly and a first curve is defined between said proximal portion and said intermediate portion and a second curve is defined between the intermediate portion and the distal portion.

15. The method of cooking a foodstuff according to claim 14, further comprising trapping of the steam in said first curve and said second curve and thus "super-heat" the steam as it travels through the steam leading tube.

16. The method of cooking a foodstuff according to claim 14, further comprising positioning the distal portion of the steam leading tube within an interior of the foodstuff being cooked.

17. The method of cooking a foodstuff according to claim 13, further comprising treating an external thread of the vessel using a hone plate to ensure proper sealing with the closing sub-assembly.

\* \* \* \* \*